United States Patent [19]
Sloyan

[11] 3,814,358
[45] June 4, 1974

[54] MOTOR BASE WITH SHOCK-ABSORBING SLIDABLE CARRIAGE

[76] Inventor: Jerome J. Sloyan, c/o Automatic Motor Base Company, Windsor, N.J. 08561

[22] Filed: May 27, 1971

[21] Appl. No.: 147,372

[52] U.S. Cl.............................. 248/23, 74/242.12
[51] Int. Cl............................................. F16m 3/00
[58] Field of Search...................... 248/23, 125, 298; 74/242.15, 242.12, 242.13 A; 308/4, 6

[56] References Cited
UNITED STATES PATENTS

| 628,658 | 7/1899 | Gould | 74/242.13 A X |
|---|---|---|---|
| 2,184,541 | 12/1939 | Aikiman | 74/242.13 A X |
| 2,260,344 | 10/1941 | Shaw | 74/242.13 R |
| 2,833,597 | 5/1958 | Sloyan | 248/23 X |
| 2,833,598 | 5/1958 | Sloyan | 248/23 X |
| 3,586,273 | 6/1971 | Sloyan | 248/23 |

Primary Examiner—J. Franklin Foss

[57] ABSTRACT

A motor base assembled with cross-members welded directly on flat areas of the slidable bearings and the base making provision for substantially even spring tension during periods of subjection to vibration imposed on the base by gyration of the driven pulley.

2 Claims, 11 Drawing Figures

INVENTOR.
JEROME J. SLOYAN

BY

ATTORNEY

INVENTOR.
JEROME J. SLOYAN

BY Howard P. King

ATTORNEY

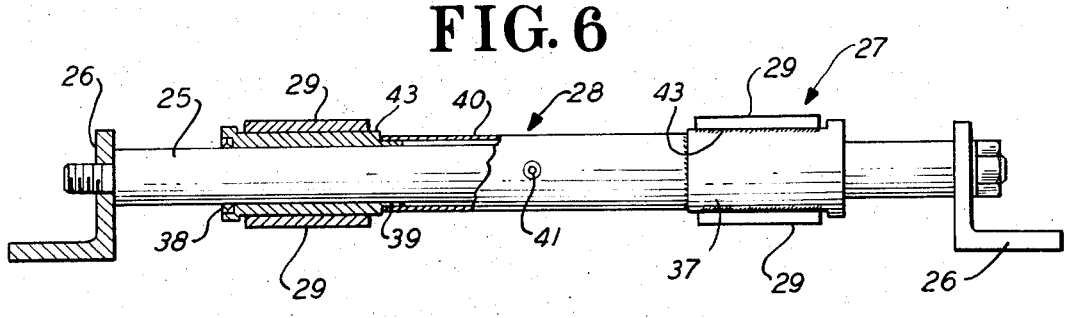
FIG. 6
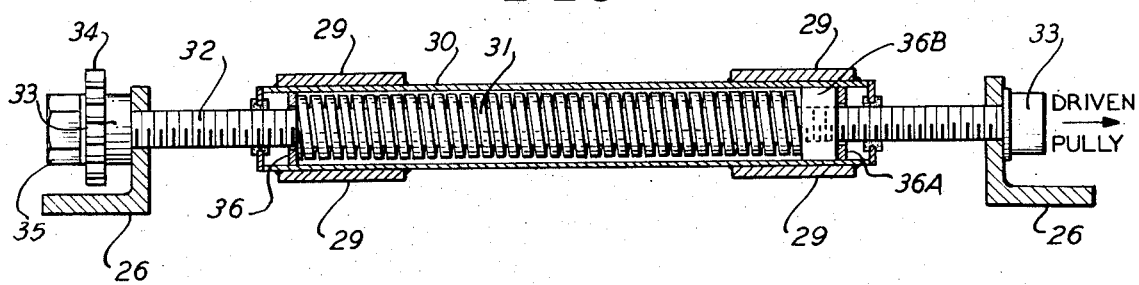
FIG. 11
FIG. 7
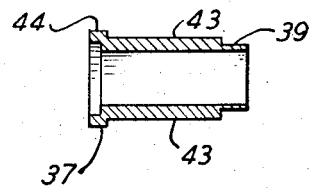
FIG. 8    FIG. 9
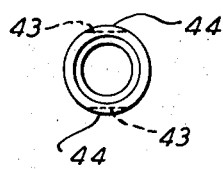 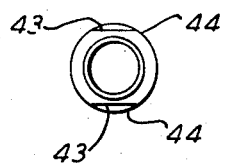
FIG. 10
INVENTOR.
JEROME J. SLOYAN
BY Howard P. King
ATTORNEY

MOTOR BASE WITH SHOCK-ABSORBING SLIDABLE CARRIAGE

THE PROBLEM

Shaker screens, foundry shake-outs vibrating elevators and similar types of equipment are very often subjected to severe shock loads and by the very function which they perform, vibrate rapidly, severely and continuously during operation. As a result, shocks and vibrations are transmitted to the motor which drives the equipment. Then, too, this type of equipment is frequently located proximate to furnaces or other heat sources, and must therefore be capable of continuous operation at high ambient temperatures. When this type of equipment is loaded with material being processed, the driven pulley shaft is depressed to a lower position than when the equipment is empty thereby producing periodic differences in the distance of the driven shaft from the motor drive shaft. The motor support is consequently subjected to intermittent severe and relaxing strains. Furthermore the rapidly repetitious vibration necessarily imposed by the operated equipment, also involves, and much more rapidly, a variation of distance between the driving and driven shafts and imposes a continuously present shift back and forth of imposed heavy strain and relaxation. Under operating conditions, the motor, when secured in fixed position, does not contribute to solution of the problems involved, but to the contrary, the problems are aggrevated, and yet the practice of mounting the motor in fixed position is almost universal for this type of equipment. In an effort to overcome the changes in center distances between shafts, it has been the practice in the prior art to apply enormous amount of tension in the driving belt. Frequent replacement of belts, and often of motors, occur as a result, thereby involving shut-downs, curtailments in operation and increased costs. It may be further stated that when the usual belt is subjected both to high temperature and enormous tension, breakage and replacement occur more often. Under these conditions, also, motor bearing suffer severely.

Considering the invention in its broadest aspect, its primary purpose is to overcome the difficulties and defects of the prior art and usages, and to do so, proposes a structure fully resistive to disintegrating propensities instigated by inherent effects of imposed differences in center locations of shafts and effects of imposed vibration and is directed primarily to structure that will serve to abate and eliminate so far as possible deleterious effects on belts, motors and motor supports previously encountered in practice.

Everyone is cognizant of the fact that when a piece of metal is repeatedly flexed at a definite spot, it will ultimately break. Vibration is an example of a source of a flexing force. By the long established theory of action and reaction being equal and opposite, spring tension or compression applied in a carriage of a motor support will, under certain conditions, counteract to absorbe vibrations. But in the type of equipment indicated above as involved that changes the center distance between driving and driven shafts, the spring tension correspondingly changes. Theoretically, a spring of infinite length would introduce only an infinitesimal difference in pressure for the short change of shaft spacing. For practical purposes, the spring has to have a finite length, but according to the invention is made as long as may possibly be included within the confines of the carriage and its compression varies so slightly under operating conditions that for all practical purposes, the tension is maintained as a constant amount. By way of specific example, suppose the carriage has to move half an inch to take care of the difference of center to center distances of the pulley shafts, and that the carriage is equipped with a fifteen inch spring, the compressed difference is only one-thirtieth of the spring length which is negligible in compressive effect of the spring. It is therefore to be understood that a feature of the invention is structure accommodating maximum length of spring within limitations established by dimensions of the carriage.

Again, it is common knowledge that vibration will instigate rotation, and as an example, will cause a nut to loosen on a screw. Consequently, if there are no hindering factors present, a bearing on a cylindrical rail will tend to rotate under influence of persistent vibration. Where, as in previous constructions of bases with slidable carriages, cross members have been located tangentially on cylindrical bearings and welded thereto substantially on the line of contact, vibration tends to twist the bearing, and like the example of repeatedly bending of metal causing breakage, so here the constant repetition of the twisting moment will ultimately often result in rupture. The deleterious mode of assembly as just described and as used in the prior art, is avoided in the present invention. Instead, the junction between the bearings and cross-members is accomplished by providing flat chordal areas on the bearings and extending the cross-members in flat-wise engagement against those areas which in itself deters rocking, but absolute immobility is accomplished by applying welds spaced from each other at opposite sides of the flats securing the bearings thereat to the cross members. There is therefore no possibility of any vibration existing or developing between the bearings and cross-members so that likelihood of rupture is effectively and entirely eliminated.

THE DRAWINGS

The invention is illustrated by way of example in the accompanying drawings, wherein FIG. 1 shows a motor mounted on a spring-tensioned motor base of the present invention, in conjunction with a driven vibrating machine;

FIG. 6 is a view partially in longitudinal elevation and partially in longitudinal section on line VI—VI of FIG. 3;

FIG. 7 is a longitudinal section similar to a portion of FIG. 6, but showing the left-hand bearing alone;

FIG. 8 is an end elevation of said bearing looking at the left-hand end of FIG. 7;

FIG. 9 is an end elevation looking at the other or right-hand end of FIG. 7;

FIG. 10 is a longitudinal elevation also similar to a part of FIG. 6, showing only the spacer that is used to form an enclosure in the assembled carriage between coaxially disposed bearings; and FIG. 11 is a longitudinal section of a spring housing and associated parts, taken on line XI—XI of FIG. 5.

DESCRIPTION

Figure 1:
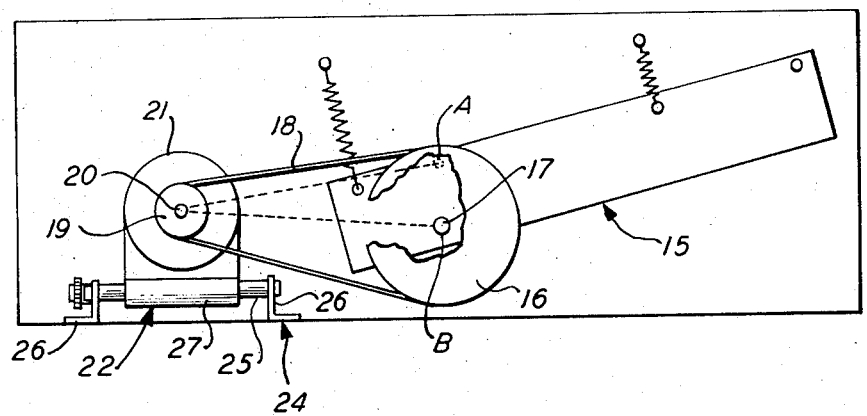

Inasmuch as the present invention has features especially advantageous in conjunction with machines productive of severe vibration and with machines involving shift of position of the driven pulley shaft thereof, a machine 15 is represented somewhat schematically in FIG. 1 wherein a driven pulley 16 is fixed on a driven shaft 17 that is movable bodily transverse to itself in a vertical path under varying conditions of load, and in all positions while rotating, by eccentrics, can or otherwise instigates vibration to a hopper, screen or other element of the selected machine. The pulley 16 is driven by belt 18 from a driving pulley 19 on a motor shaft 20 of a motor 21 mounted on a motor base 22 of the present invention. It will be appreciated that since the driven shaft 17 has a vertical range of movement transverse to itself from a location A to a location B, for instance, whereby a difference of distance results between the shaft centers during operation, and that difference is accommodated by the motor 22 responsing correspondingly by virtue of being mounted on the spring-loaded movable carriage, herein shown, which maintains tension in the driving belt 18. Vibration imposed in the driven machine 15 is also unfortunately transmitted to a large extend through the belt drive to the motor 21 and motor base 22.

Figure 2:
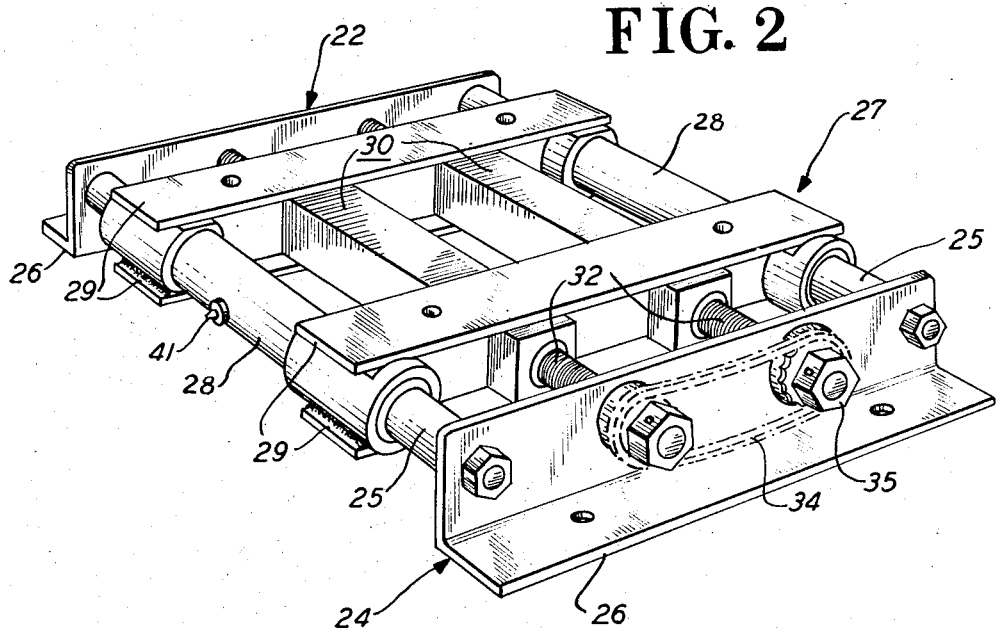
FIG. 2 is a perspective view of a two-rail motor base alone.
Figure 3:
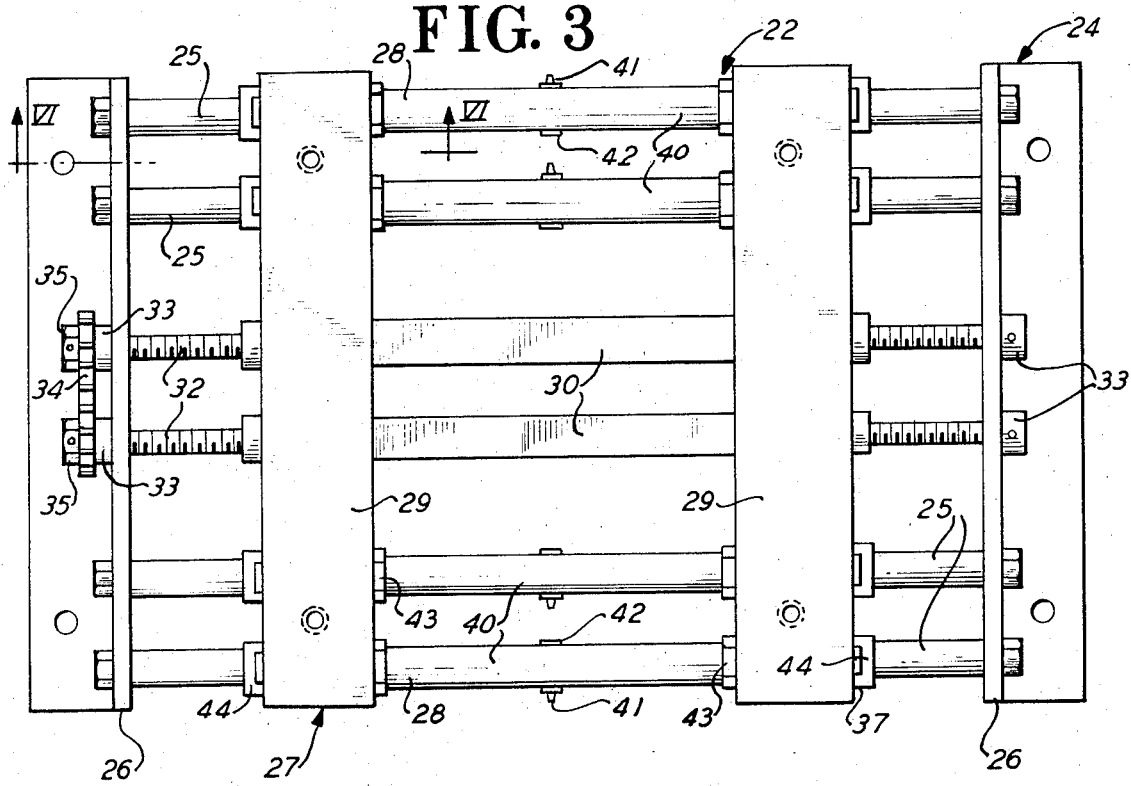
FIG. 3 is a plan of a four-rail motor base.
Figure 4:
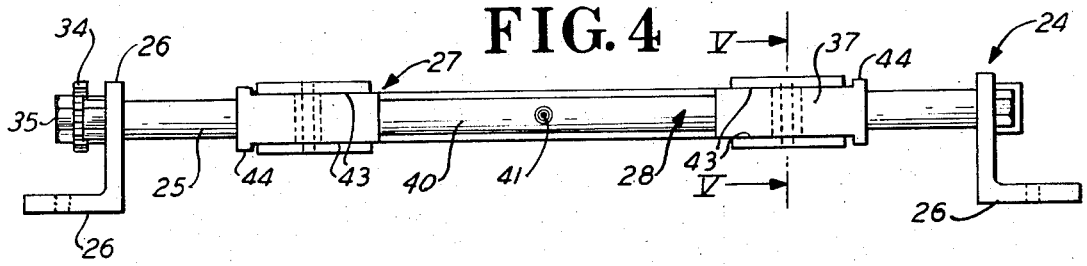
FIG. 4 is a longitudinal side elevation of the motor base.
Figure 5:
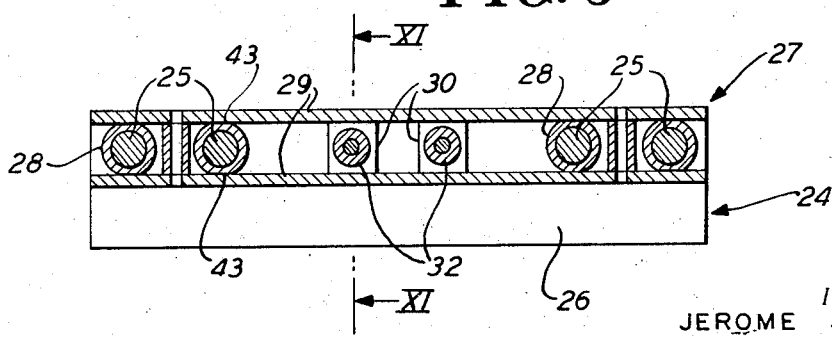
FIG. 5 is a cross-section taken on line V—V of FIG. 4.

Directing attention to the motor base, it may be observed that in its general organization the herein disclosed motor base has considerable resemblance to prior art bases such as, for instance, my U.S. Pat. No. 2,833,598 of May 6, 1958 in that it includes a rigid basal body portion 24 adapted to be secured in a fixed position. Said basal body portion includes cylindrical or rod-like parallel rails 25 mounted securely at their front and rear ends in headers 26. In the illustrated construction of FIGS. 3 and 5, there are four rails, two near each side of the body portion, but aside from necessity of at least two adequately spaced apart, as in FIG. 2, the invention is not limited in the number of rails employed, the criteria being a matter of providing adequate supporting strength for the intended use.

Slidably carried by said rails 25 is a carriage 27 the length whereof from front to rear is appropriately less than the length of the rails as well as less than the distance between the front and rear headers, so as to permit some latitude in the location of the base depending upon the distance between the centers of the motor and driven shafts and the length of belts available. As an integral part of the carriage, the invention utilizes a plurality of gliders 28 each of which is individual to a respective rail on which it has slidable chatterless sliding fit. All of the gliders are rigidly secured to cross-members 29 which extend in surface engagement transverse to and across the several gliders. For maximum rigidity, cross-members 29 are provided both at the forward end regions and at the rear end regions of the bank of gliders and at each region are arranged in pairs with one cross-member above and another one below the gliders.

Medially of and also constituting an integral part of the carriage 27, in parallelism with the gliders 28, is at least one square tube housing 30 for containing a coil compression spring 31 longitudinally therein. Two such housings 30 are shown, each with its own spring 31 and each having a length commensurate with the front-to-rear length of the carriage so that the springs may have maximum lengths within the housings within the limitations of the carriage dimensions. The said housings 30 extend through the spacing between the cross-members of the pairs of cross-members and are dimensioned appropriately for obtaining surface contact of the top and bottom faces of the housings with the proximate faces of the cross-members. The housings and cross-members are welded together at their contiguous edges, thereby constituting the housings an integral part of the carriage and augmenting the tigidity thereof.

Longitudinally of each housing and projecting at both ends thereof, is a threaded rod or screw 32 which is substantially coaxial with the respective spring 31 in the housing. The screw 32 in each instance projects through the front and rear headers 26 and receive permanently attached heads 33 at the outside of each header to prevent longitudinal displacement of the screw but having permissible rotation. The screw is in essence a part of the basal portion of the motor base. If so desired where two or more screws are used, they may have interconnecting sprocket wheel and chain drive 34 so that they may be rotated in unison. A fixed nut or head 35 is provided on the forward end of one or both screws as a means for rotating the same manually if and when adjustment of tension or carriage location forwardly or rearwardly is required.

As indicated above, it is a feature of the invention to minimize tension difference to the belt instigated by vibration or caused by change of spacing distance occurring between the pulley shafts 17 and 20. Effective spring tension as well as spring length utilized serve in part to accomplish the desideratum. Further accomplishment is derived by arranging for use of maximum length of spring within the housing. It is therefore a particular feature to provide spring front and rear abutments 36 and 36A respectively as close as practical at the forward and rearward ends of the housing 30. As shown, said abutments 36 and 36A have a size and shape to fit within the housing 30, and are secured close to their respective end opening of the housing by welding at their peripheries. Presence of the abutments also has a beneficial effect of helping to maintain the square tube configuration from lateral distortion. The abutments are of course provided with a central openings for free passage of screw 32 therethrough.

Also within the square tubular housing at the rear end portion thereof, that is, the end nearest the driven pulley, and proximate to the rear fixed abutment 36A, is an adjustably movable abutment which may conveniently comprise a nut 36B threaded agreeable to the threading of said screw and operatively assembled thereon. Said nut 36B has a size and square shape to be non-rotatively but slidably retained in said housing, and is located at the opposite end of the spring from the front fixed abutment 36.

When the belt 18 on the pulleys 16 and 19 is slack, rotating adjusting screw 32 clockwise will cause follower nut 36B to move toward the front of the base (to the left of FIG. 1) and in so doing will apply a force through spring 31 on the front abutment 36 and because that abutment is welded to square housing 30, which is part of the carriage assembly, said carriage 27 will be moved toward the front of the base. As adjusting screw 32 continues to be rotated clockwise, a point will be reached where all of the slack has been removed from the belt. At this point the belt begins to offer resistance to any further forward movement of the carriage. As the adjusting screw continues to be rotated clockwise, and since the carriage is restricted from further movement, follower nut 36B will progressively compress spring 31 against front abutment 36. The force exerted by the spring being compressed is equal to the tension being applied to the belt. The overall lengths of gliders 28 and spring housing 30 are substantially the same and limit the extent which the carriage 27 can be adjusted between headers 26.

When the belt 18 is to be replaced, the adjusting screw 32 is rotated counter-clockwise. By so doing, follower nut 36B moves toward the rear of tubular housing 30 until it contacts the rear abutment 36A. Continued counterclockwise rotation of the screw 32 causes the nut 36B to forcefully push against the contacted abutment and since that abutment is fixed in the housing 30 and the housing is an integral part of the carriage, the carriage is thereby slid rearwardly toward the driven pulley 16 and the belt 18 consequently loosened.

The arrangement described permits the use of a spring means utilizing one or more springs 31 of maximum length consistent with the limits of the structure, providing the necessary flexibility to cope with the continuous variations in the center distance between the pulleys 16 and 19 without having to apply any more tension to the belt than is necessary to drive the driven equipment without the belt slipping.

In this connection it may be explained that the spring means is intended to function with a minimum of tension variation throughout the range of vibrational movement of the carriage imposed by gyration of the driven pulley or by other causes. The use of multiple springs to constitute the spring means not only reduces the normal compression of each individual spring, but also correspondingly reduces the tension variation of each in the range of the gyration. For instance, use of two individual springs to comprise the spring means, halves the required resistance to compression in each individual spring for normal belt tension required and halves the compression variation in the range of vibrational or gyrational movement. Three springs to constitute the spring means would attain corresponding reductions by one-third. In other words, increases of over-all spring length for a given belt tension, correspondingly reduces the proportion of tension variation imposed by the vibrational gyration of the driven pulley.

It has also been observed above that a feature of the invention is directed to prevention of any possible vibration or twist occurring between the gliders and the cross-members. Particular attention is therefore directed to the construction of the gliders and to their relation and attachment to the cross-members. The gliders are of three-piece construction aligned and welded end-to-end on a common axis. The gliders each provide end portions comprising bearings 37 of generally cylindrical external configuration and also having cylindrical internal surfaces or bores the diameter of which corresponds to the diameter of the cylindrical rail on which the bearing has a sliding fit. What may be termed the outer end of each bearing has an enlarged counterbore to accept and hold a seal 38 therein of appropriate character to exlude dirt and to retain lubricant. At what may be termed the inner ends of the bearing members an external peripheral rabbet is formed thereby providing an end neck 39 next to the inner surface or bore and of less outer diameter than the generally cylindrical outer surface of the bearing. A third element comprised in the assembly of the glider is a tubular cylindrical sleeve or spacer 40 the inner diameter of which corresponds to the outer diameter of said neck so the spacer can be slid onto the neck and when slid home on both bearings for the full lengths of both necks and the over-all exact desired length of the glider is established whereupon the bearing members are welded to said sleeve or spacer establishing a unified rigid entity having a common axis throughout its length. In passing, it may be pointed out that each glider spacer or sleeve 40 is advantageously provided at one side with an ingress fitting 41 through which lubricant may be introduced into the space, serving as a reservoir, existing between the rail and the spacer. Such fittings on the market are self-closing against back-flow, but to avoid creating excessive pressure of lubricant that might dislodge the aforementioned seal 38 a pressure-responsive escape or egress fitting 42 may also be provided in each spacer sleeve.

A most important feature of the invention resides in the attachment and rigid retention of the gliders 28 to the cross-member 29. Essential to solution of this problem is the provision of chordal flats 43 at the top and bottom of each bearing member 37 in planes parallel to each other, each flat having a width substantially equal to the diameter of the internal bore of the bearing and corresponding diameter of the rail on which the bore has its sliding fit. The distance normal to said planes, between the pair of flats is preferably exactly equal to the height thickness of the square tubular housing 30. By virtue of the flatwise engagement of the opposed cross-members against said flats the bearing members will be gripped firmly and thereby be deterred from rotating. This retention of the bearing members against rotation is augmented and made relentlessly certain by welding the cross-members at edges of the flats. There consequently cannot be any possible teetering of the flats with respect to the cross-members so no vibration can exist between the cross-members and bearings and rupture instigated by metal fatigue is entirely eliminated.

Attention is called to the fact that in forming the flats 43 the length of each longitudinally of the bearings is less than the length of said bearing, thereby leaving a flange 44 terminating one end of the flat. It is preferable to form said flange 44 at what has been referred to as the outer end of the bearing as a result of which the several flanges will be located at the top and bottom at both ends of the glider. These flanges constitute convenient guides in fabrication of the carriage as they may be brought into engagement with the proximate edge of the cross-member for accurate location of cross-members and gliders preparatory to welding.

I claim:

1. A motor base comprising parallel fixed rails, a carriage slidable on said rails, tubular housing means integral with said carriage and parallel to said rails, said housing means having abutments proximate to each of the ends thereof screw means longitudinally within and projecting at both ends of said housing means and mounted at said ends to be rotatable but secured from longitudinal displacement in relation to said rails, a nut threaded on said screw means, said nut being retained from rotation by and within said housing means but slidable therein, spring means within said housing means coiled around said screw means, said spring mans being interposed longitudinally between one of said abutments and said nut and said nut being located between said spring means and an opposite one of said abutments at the other end of said housing means, said spring means having a range of resistance to vibrational compression of incremental proportion to permissible normal compressability of the entire said spring means, whereby the spring tension has minimum variation over said range of vibrational compression.

2. A motor base having parallel cylindric rails and a carriage slidably mounted on said rails, a plurality of hollow bearings each interposed between a respective rail and the carriage, each said bearing having a cylindrical inner surface making sliding fit on its respective rail, and said bearing having an outer surface substantially cylindrical except for a chordal flat area the width whereof in a direction transverse to the cylinder axis being less than a quarter of the circular length of the circumference of the said outer cylindrical surface of the bearing, and a cross-member welded to the bearing in permanent engagement on said flat area and projecting laterally therefrom crosswise of the carriage, said cross-member being common to two opposite bearings respectively on two different rails thereby being as great as the distance between the respective rails, characterized by the inner ends of the bearings facing toward each other on each rail providing annular shoulders of greater diameter than the rail, a tube on each rail extending from bearing to bearing fitted onto said shoulders and circumferentially welded to the bearings to form an enclosure and oil reservoir for feeding oil to the interirior of said bearings, and means for introducing and retaining oil in said reservoir.

* * * * *